UNITED STATES PATENT OFFICE.

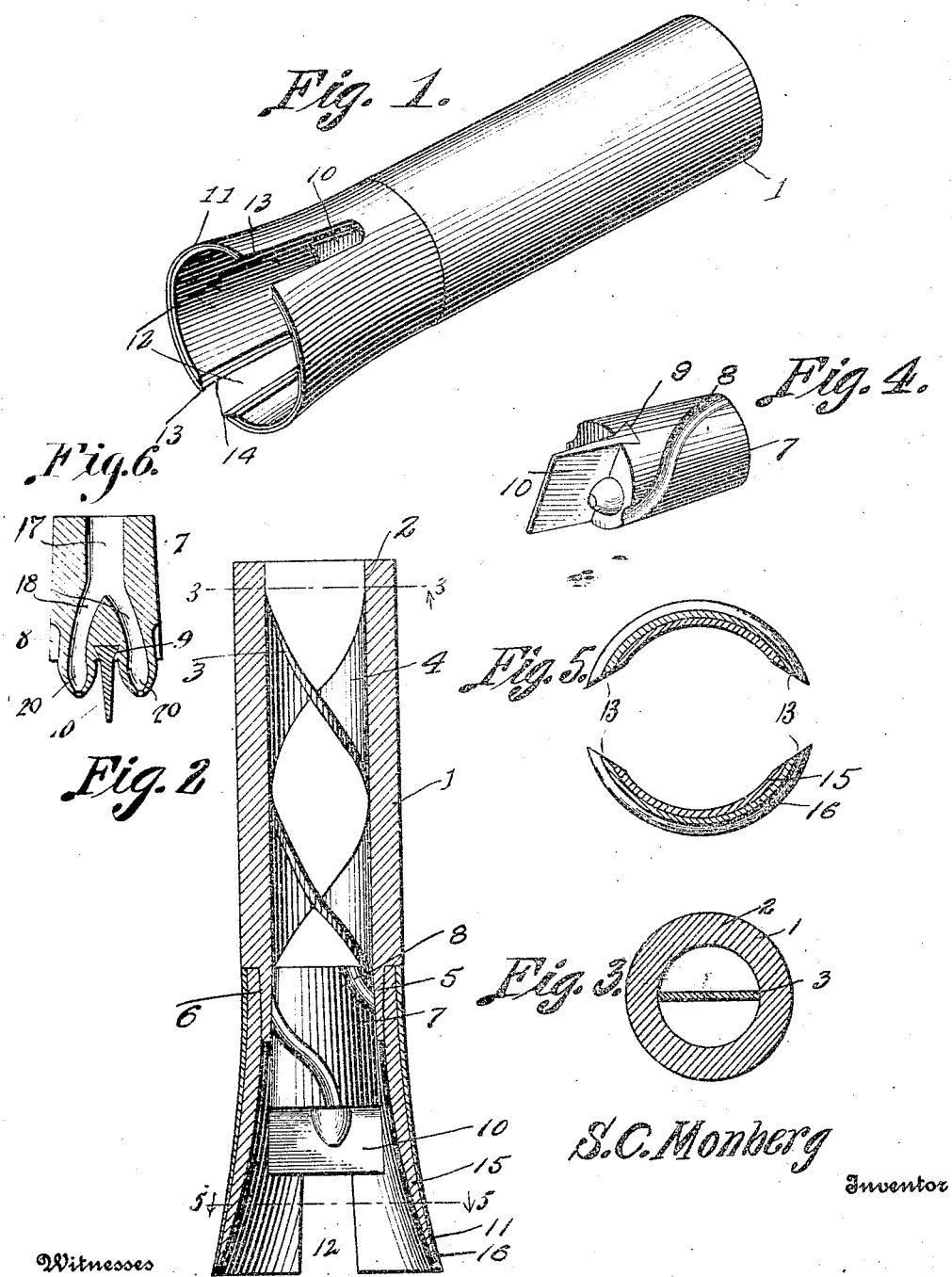

SOREN C. MONBERG, OF LEADVILLE, COLORADO.

CUTTING-TOOL.

1,060,929.  Specification of Letters Patent.  Patented May 6, 1913.

Application filed May 15, 1912. Serial No. 697,542.

*To all whom it may concern:*

Be it known that I, SOREN C. MONBERG, a citizen of the United States of America, residing at Leadville, in the county of Lake and State of Colorado, have invented new and useful Improvements in Cutting-Tools, of which the following is a specification.

This invention relates to improvements in cutting tools and has particular application to tools for use in conjunction with hydraulic drilling machines.

In carrying out the present invention, it is my purpose to provide a cutting tool which when applied to the work will effectively cut or drill into the same and wherein the motive fluid will be fed to the cutter to facilitate the cutting or drilling action.

Furthermore, I aim to provide a cutting tool of the class above described which when attached to the driving mechanism of the drilling machine will be rotated by hydraulic pressure with the effect to drill into or cut the work and which will effectively spread the motive fluid around the cutter so as to enable the latter to operate with ease and facility.

A further object of my invention is the provision of a cutter for the cutting tool which will be constructed of soft and relatively hard metals, the former wearing away under the cutting action so as to relieve the latter of wear and maintain the cutting edge sharp.

A further purpose of the invention is the provision of a cutting tool which will embrace the desired features of simplicity, efficiency and durability, coupled with cheapness of cost and manufacture and which may be applied to any type of hydraulic rotary drilling machine and rotated thereby.

With the above and other objects in view, the invention consists in the construction, combination and arrangement of parts hereinafter set forth in and falling within the scope of the claims.

In the accompanying drawing, I have shown one preferred and practical embodiment of my invention, and in this drawing:

Figure 1 is a perspective view of a cutting tool constructed in accordance with the present invention. Fig. 2 is a central longitudinal sectional view of the same. Fig. 3 is a transverse sectional view through the shank of the tool. Fig. 4 is a detail perspective view of the spraying nozzle, and Fig. 5 is a cross sectional view of the cutter head. Fig. 6 is a longitudinal sectional view through the spraying nozzle.

In carrying my invention into practice, the shank of the cutting tool is designed to be connected to a rotary actuating member or may be formed integral therewith and is provided with a spiral passage way for the water so that such water may be forced under pressure into the passage way with the effect to impart a rotary movement to the shank and cutter head.

Referring now to the accompanying drawing in detail, my improved cutting tool embodies a shank 1 which is preferably hollowed out to provide a longitudinal bore 2, and this bore 2 has mounted therein and preferably rigidly secured to the walls thereof, a partition 3 having a helical pitch with respect to the axis of the bore and forming a spiral passage way 4. The shank 1 at one extremity terminates in a circumferentially reduced nipple 5 formed with an outwardly flared and tapered wall 6 into which is inserted a nozzle head 7 of a contour similar to that of the wall 6 and adapted to be wedged into the nipple 5. This nozzle head 7 terminates an appropriate distance beyond the nipple 6 and at diametrically opposite points is provided with spiral passages 8, 8 and has formed transversely thereof a groove 9 disposed approximately centrally of the outer ends of the passages 8, 8 and preferably dovetailed in cross section. Slidably disposed within the groove 9 is an auxiliary cutter 10 having its groove received portion of a configuration corresponding to that of the groove.

The cutter head is indicated by the numeral 11 and in the present instance is of substantially circular outline in cross section and tapered longitudinally and has its relatively small end surrounding the nipple 5 and the nozzle head 7, the cutter head being keyed to the nipple 5 or welded thereto, as desired. This cutter head, as shown, is of a length exceeding the combined length of the nipple and nozzle head and incase the latter and projects outwardly therefrom and is provided at diametrically opposite points with elongated slots 12 opening onto the free extremity of the head and each having its walls beveled or inclined as at 13, the inner surface of the free edge of the cutter head being beveled or inclined as at 14 and coöperating with the beveled walls 13 to produce a cutting action in the rotation of the head.

I have found in practice, that cutter heads of drilling machines, particularly where utilized in rock drilling, lose their cutting edges after a relatively small amount of work has been accomplished and that the work accomplished by the cutter heads is not commensurate with the labor required to resharpen the heads. To obviate premature dulling of the cutting edges of the head and to prolong the life of the heads, I make the same of soft and relatively hard metals so that the soft metal will, under the action of the cutter head, wear away and relieve the hard metal and consequently the cutting edge of wear. The interior of the head 11 has a lining 15 of soft metal and a covering 16 of relatively hard metal, the latter being formed at the slotted portions of the head and the free extremity thereof to provide the beveled cutting edges 13 and 14 respectively. Thus, when the cutter head is applied to the work and rotated to produce the cutting action, the lining 15 will wear out and receive the bulk of the wear while the covering 16 will remain serviceable and maintain its cutting edges for a relatively long time.

From the foregoing description taken in connection with the accompanying drawing, the construction, mode of operation and manner of employing my invention will be readily apparent. The hollow shank 1 is connected up to the actuating member of the drilling machine in any suitable manner or formed integral therewith if such is found desirable. The motive fluid, such as water, is forced into the spiral passage way 4 under pressure and owing to the helical pitch of the partition forming such passage way imparts a rotary movement to the tool and flows outwardly of the nozzle head 7 by way of the spiral passages 8 and is thrown against the interior of the cutter head with the effect to facilitate the cutting action. In the operation of the cutting tool, the auxiliary cutter 10 serves to break up the rock or other material and prevent the same from clogging up the spiral passages 8, 8 and also assists the cutter head 11 to perform its duty.

In some instances, it may be found advantageous to discharge water from the spraying nozzle 7 directly against the bottom or lower wall of the hole being drilled or bored so as to facilitate the cutting action and assist the cutter 10 in functioning. For this purpose, the nozzle 7 has formed therein a channel 17 in open communication with the hollow shank 1 and terminating in forked passages 18, 18 in open communication with nipples 20 secured to one end of the nozzle 7 at the opposite sides of the cutter 10 carried thereby. Thus, the water is discharged out of the lower end of the nozzle at the opposite sides of the cutter 10 and impacts against the lower wall of the hole being drilled, thereby facilitating the cutting operation.

While I have herein shown and described one particular embodiment of my invention by way of illustration, it is to be understood that I do not confine myself to the precise details of construction herein described and delineated, as modification and variation may be made within the scope of the claims and without departing from the spirit of the invention.

I claim:

1. A cutting tool comprising a hollow shank having a spiral passage way therein, a nozzle disposed within one end of said shank and provided with spiral passages, and a cutter secured to the nozzle end of such shank and surrounding said nozzle and extending outwardly thereof.

2. A cutting tool comprising a hollow shank having a spiral passage way therein, a partition having a helical pitch with respect to the axis of the shank and forming said passage way, a nozzle disposed within one end of said shank and provided with spiral passages in communication with the shank, and a cutter secured to the nozzle end of said shank and surrounding said nozzle and extending downwardly thereof.

3. A cutting tool comprising a hollow shank having a spiral passage way therein, a nozzle disposed within one end of said shank and provided with spiral passages in communication with said shank, an auxiliary cutter detachably connected to said nozzle head and arranged transversely thereof, and a cutter head secured to the nozzle end of said shank and surrounding said nozzle and extending outwardly thereof.

4. A cutting tool comprising a hollow shank having a spiral passage way therein adapted to receive a fluid under pressure to rotate the tool, a cutter head rigidly secured to said shank and provided with side and end cutting edges and comprising a body having a lining of soft metal and a covering of relatively hard metal.

5. A cutting tool comprising a hollow shank having a spiral passage way therein adapted to receive a fluid under pressure to rotate the tool, and a cutter head on said shank.

6. A cutting tool comprising a hollow shank having a spiral passage therein adapted to receive a fluid under pressure to rotate the tool, a nozzle disposed within one end of said shank and provided with a chamber in open communication therewith and terminating in forked passages, nipples secured to said nozzle and in communication with the passages therein, and a cutter head on said shank.

In testimony whereof I affix my signature in presence of two witnesses.

SOREN C. MONBERG.

Witnesses:
C. J. McCarty, Jr.,
Aline Whipple.